United States Patent [19]

Horgan

[11] Patent Number: 4,857,990
[45] Date of Patent: Aug. 15, 1989

[54] DIGITAL VIDEO STORAGE

[75] Inventor: Thomas B. Horgan, Londonderry, N.H.

[73] Assignee: Computer Devices, Inc., Nutting Lake, Mass.

[21] Appl. No.: 205,622

[22] Filed: Jun. 1, 1988

Related U.S. Application Data

[63] Continuation of Ser. No. 876,717, Jun. 20, 1986, abandoned.

[51] Int. Cl.[4] .......................... H04N 9/45; H04N 9/64
[52] U.S. Cl. .......................................... 358/13; 358/19; 358/25
[58] Field of Search ........................ 358/13, 17, 19, 25

[56] References Cited

U.S. PATENT DOCUMENTS

| | | | |
|---|---|---|---|
| 3,909,839 | 9/1975 | Inaba et al. | 358/17 |
| 3,946,432 | 3/1976 | Goldberg et al. | 358/13 |
| 4,101,926 | 7/1978 | Dischert et al. | 358/19 |
| 4,151,550 | 4/1979 | Dinstein | 358/13 |
| 4,212,027 | 7/1980 | Lemoine | 358/17 |
| 4,227,204 | 10/1980 | Rossi | 358/13 |
| 4,249,212 | 2/1981 | Ito et al. | 358/183 |
| 4,322,739 | 3/1982 | Drewery et al. | 358/13 |
| 4,325,075 | 4/1982 | Kashigi | 358/13 |
| 4,349,833 | 9/1982 | Clarke | 358/23 |
| 4,400,717 | 8/1983 | Southworth et al. | 358/141 |
| 4,531,147 | 4/1985 | Kouyama | 358/13 |
| 4,531,151 | 4/1985 | Hentschke | 358/135 |
| 4,549,201 | 10/1985 | Tanaka et al. | 358/13 |
| 4,567,506 | 1/1986 | Shinoda et al. | 358/11 |

OTHER PUBLICATIONS

Hashimoto et al., Digital Separation and Reconstruction of NTSC Signals, IEEE Transactions on Communications, COM-28, No. 7 July 1980, pp. 1085-1088.

*Primary Examiner*—John W. Shepperd

[57] ABSTRACT

A simple, efficient technique for encoding NTSC video signals features sampling the signal at 8/3 the subcarrier frequency, generating no more than 256K samples for a full 525 line frame, generating as many samples per horizontal scan line as there are columns in a memory where the frame is to be stored, incrementing a row address counter for the memory once for each new horizontal scan line, and providing an analog reproduction of the color burst signal directly from and based solely on the digital samples of the color burst signal.

25 Claims, 8 Drawing Sheets

DIGITAL VIDEO STORAGE

This is a continuation of co-pending application Ser. No. 876,717 filed on June 20, 1986, now abandoned.

BACKGROUND OF THE INVENTION

This invention relates to digital encoding, storage, and retrieval of analog composite color video signals, e.g., NTSC signals, for use in, for example, TV still frame systems, digital TV receivers, and electronic publishing systems.

Digital encoding of such signals enables video images to be stored and retrieved at will. Even when not stored, such digitally encoded images have advantages over their analog counterparts.

Any digital encoding and retrieval system needs to allow recapture of the frame synchronization, color burst, and picture information that appeared in the horizontal scan lines of the original analog NTSC signal. Also, when the images are to be stored, the system must provide a memory addressing scheme for assigning the digitized information to locations in memory.

Digital encoding typically involves independently sampling each of the red, green, and blue components of the picture signal, a scheme which requires a substantial amount of memory space.

Kashigi, U.S. Pat. No. 4,325,075, discloses a different encoding technique in which the original composite NTSC signal is directly sampled to generate 576 samples for each of 512 horizontal scan lines. The samples are stored in random access memory (RAM) using a complicated RAM address mapping scheme.

It is known that the sampling rate for digital encoding should be at least as high as the Nyquist sampling rate. In the system described by Kashigi, sampling was done at three times the subcarrier frequency.

Typical video playback devices, whether analog or "digital", use a 3.58 MHz crystal controlled clock and analog "sandcastle" circuitry for setting the phase of the clock based on the color burst information contained in the horizontal scan line. Such playback devices also contain analog circuitry for establishing and maintaining a DC blanking level for the horizontal scan line.

SUMMARY OF THE INVENTION

The invention provides a simple, efficient digital encoding technique that captures an entire image in a relatively small number of digital samples, thus reducing the amount of space required to store the image, or the bandwidth of the channel required to transmit the image. The number of digital samples per image are few enough to be stored in a relatively small, inexpensive, and readily available standard memory chip using a simple, efficient memory addressing scheme. The samples are delivered at a rate that is slow enough (slower than 10 MHz) to take advantage of relatively fast dynamic random access memories. Information about the color burst is stored in a way that completely avoids the need for conventional analog sandcastle circuitry in order to reproduce the image, thus enabling an inexpensive, truly digital retrieval system. The manner in which the color burst is sampled assures proper coordination between the blanking level of the color burst samples and the blanking level information that is inherent in the stored picture signal samples.

A general feature of the invention is sampling the color burst signal appearing in each horizontal scan line and then generating a reproduction of the color burst signal directly from and based solely upon the digital samples of the color burst signal.

Preferred embodiments of the invention include the following features. The digital samples span less than all of the color burst signal. An integral number of digital samples exactly span an integral number of cycles of the subcarrier of the NTSC signal. The digital samples are generated at the rate of 8/3 times the subcarrier frequency of the NTSC signal. The average level of the digital samples equals the blanking level of the NTSC signal. A register is provided for storing a sequence of the samples and the samples are withdrawn from the register at a rate and in an order such that the withdrawn samples represent a reproduction of the color burst signal having a predetermined phase relationship to a reproduction of the color picture signal (e.g., 0°). A second reproduction of the color burst signal having a second predetermined phase offset (e.g., 90° away from the phase offset of the first reproduction) can be generated by withdrawing samples from the register for delivery at an appropriate rate and in an appropriate order. The samples are withdrawn repeatedly in cycles to generate a reference wave for use in demodulating the color picture signal. The color burst reproduction can be converted to analog form.

Another general feature of the invention is generating digital samples of an NTSC signal at a predetermined sampling rate of 8/3 times the subcarrier frequency of an NTSC signal.

Preferred embodiments of the invention include the following features. The samples are taken only during a portion (e.g., three cycles) of the color burst signal and during the (entire) color picture signal in each horizontal scan line. The samples are stored in a memory no larger than 256K samples. A digital-to-analog converter is provided for reproducing the NTSC signal from the samples.

Another general feature of the invention is encoding an entire 525-line video frame in a set of digital samples numbering no more than 256K samples.

Preferred embodiments of the invention include the following features. The digital samples comprise 512 samples for each of 512 horizontal scan lines. The 512 samples for each horizontal scan line include eight samples taken from the color burst signal portion of the NTSC signal, and 504 samples covering the picture signal portion of the NTSC signal.

Another general feature of the invention is in digitally encoding and storing the horizontal scan lines of an analog composite color NTSC video signal, by generating digital samples of the signal, storing the samples in a memory having row and column address inputs, detecting the horizontal synch signal in each horizontal scan line, incrementing the row address by one for each succeeding horizontal scan line, and incrementing the column address by one for each successive digital sample from a given scan line, the number of samples generated for each horizontal scan line being equal to the number of columns in the memory.

Other advantages and features will become apparent from the following description of the preferred embodiment, and from the claims.

DESCRIPTION OF THE PREFERRED EMBODIMENT

We first briefly describe the drawings.

Drawings

STRUCTURE AND OPERATION

Figure 1:
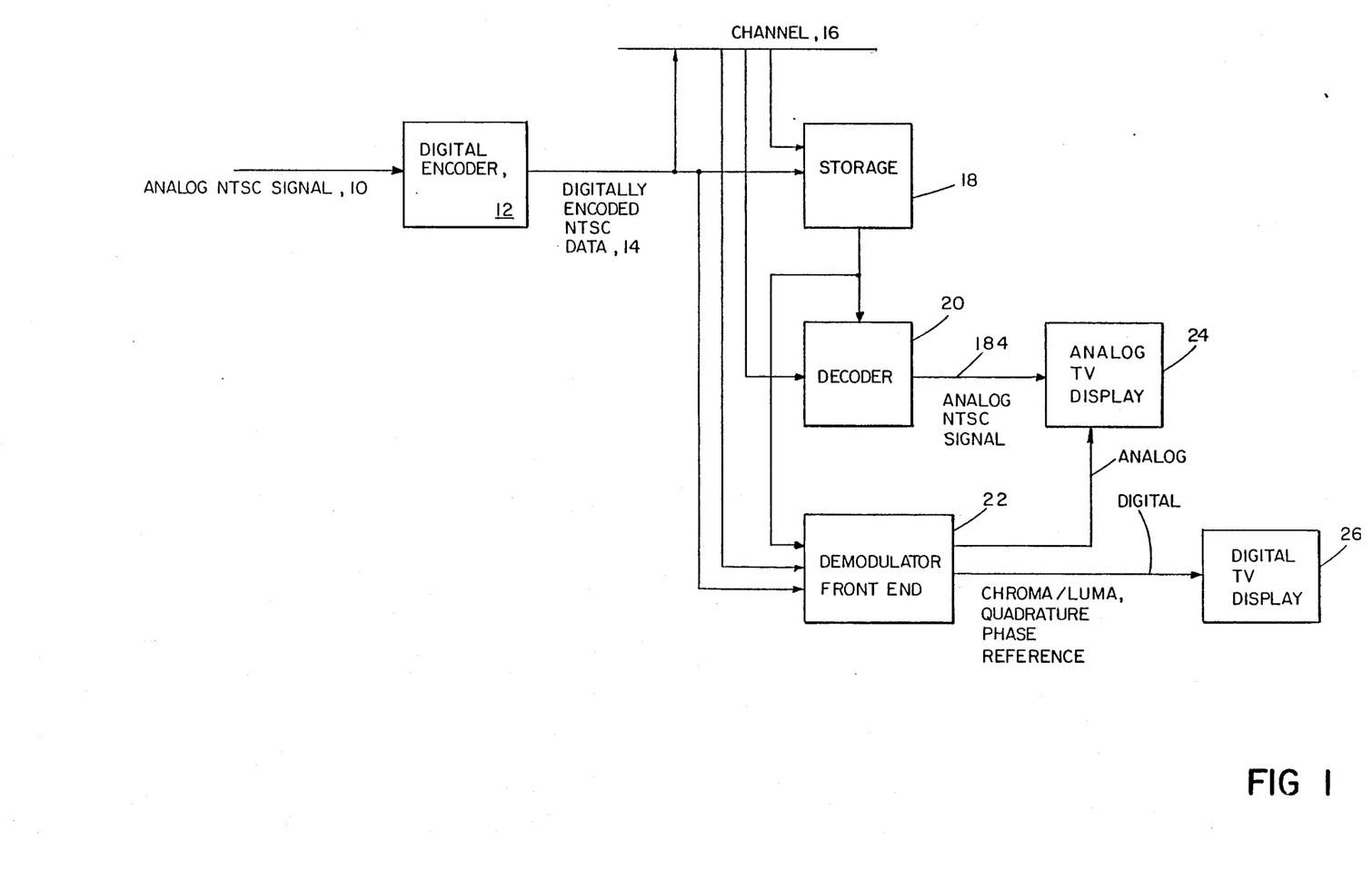
FIG. 1 is a block diagram of digital video systems.

Referring to FIG. 1, the features of the invention can be used in a variety of combinations and applications all of which begin with a conventional analog NTSC signal 10 of a 525-line video frame. Signal 10 is fed to a digital encoder 12 which encodes the frame as a stream of 256K samples of digitally encoded NTSC data 14. Data 14 can then either be transmitted via a channel 16, or sent directly to a storage device 18, a decoder 20, or a demodulator front-end 22. If stored in storage device 18, the data can later be fed either to decoder 20 or demodulator 22.

Storage 18 may be a dynamic RAM capable of storing as few as one frame, or any other form of storage device, including for example a laser optical disc capable of storing several thousands of frames.

Decoder 20 recovers the original analog NTSC signal from the digital data and feeds it to any device that normally uses such a signal, e.g., an analog TV display 24.

Demodulator front-end 22, on the other hand, generates chroma/luma and quadrature phase reference signals from the digital data 14, and feeds them to any device which can use such signals for demodulation and display. The signals can be provided in digital form, in which case they could be used, e.g., in a digital TV display 26, or in analog form (e.g., in display 24)

Before proceeding to a more detailed description of the encoder, storage, decoder, and demodulator front-end, we first review the relevant features of the NTSC signal.

Figure 2:
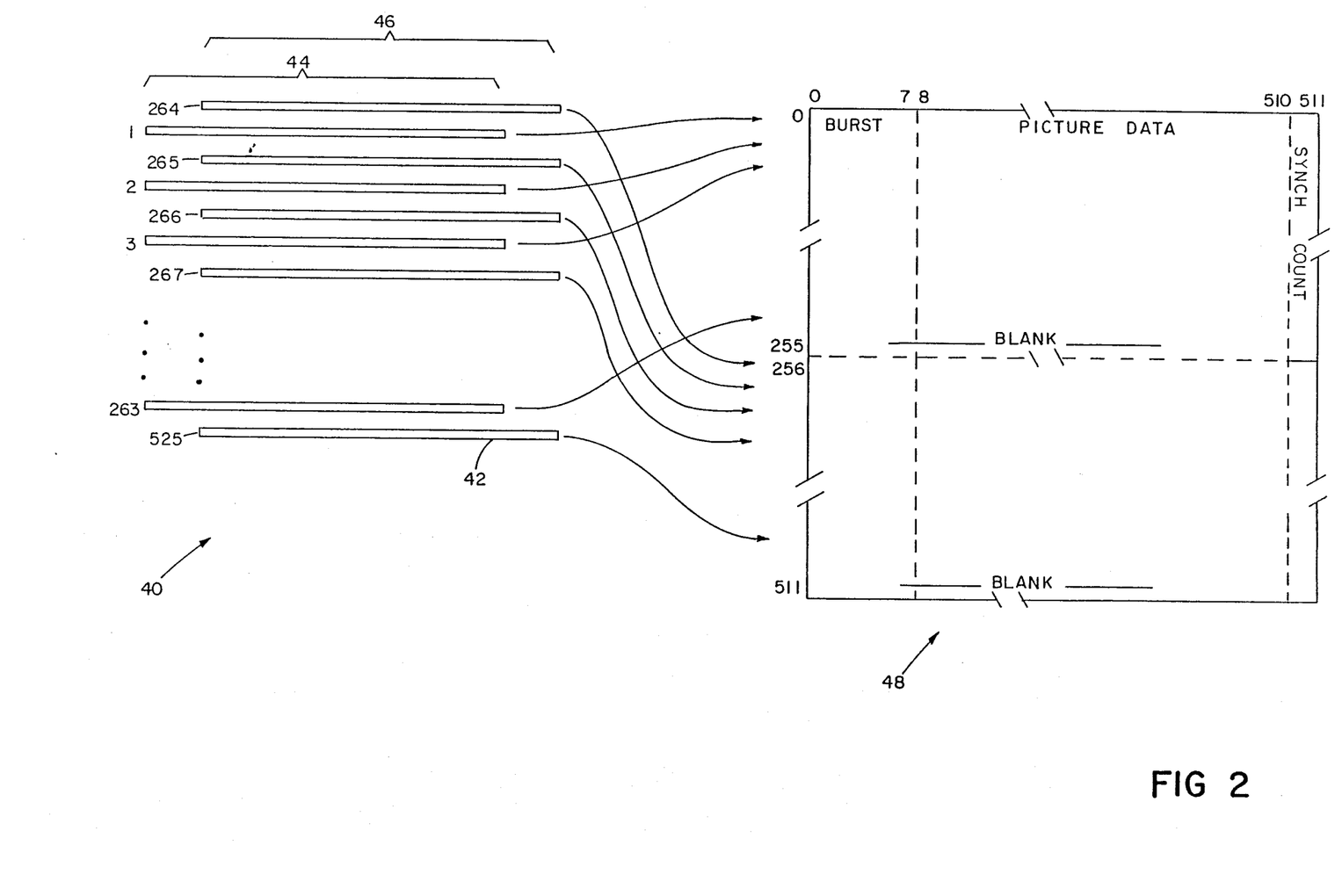
FIG. 2 is a diagram of a video frame and a memory for storing the frame.

Referring to FIG. 2, in the conventional NTSC video format, a color image is represented by a frame 40 that comprises a series of horizontal scan lines 42 which are organized into two interlaced fields 44, 46. (The two fields are shown offset horizontally with respect to one another for ease of illustration). As shown, the scan lines in field 44 can be numbered beginning with 1 at the top of the frame and ending with 263 at the bottom of the field; the scan lines in field 46 can be similarly numbered from 264 to 525. The complete frame is 525 lines of which there are actually $262\frac{1}{2}$ lines in each field. Of the $262\frac{1}{2}$ lines, 21 are vertical blanking lines, leaving only $241\frac{1}{2}$ lines of interest.

In the invention, the frame is stored in 256K memory locations of a digital random access memory 48. The 256K locations are conceptually organized in a matrix of 512 rows and 512 columns. The first field is stored in rows 0 to 255, the second field in rows 256 to 511. Because only $241\frac{1}{2}$ rows of each field contain actual picture information, 15 rows of memory 48 are written with blank information, i.e., 15 of the rows between row 0 and row 255 contain blank information and likewise for 15 of the rows between row 256 and row 511. Although FIG. 2 indicates that the blank rows appear at the end of each section of memory 48, some or all may alternatively appear at the beginning of each section. The picture signal information in each horizontal scan line is divided into 504 discrete data points that are stored respectively in columns 8 through 511 of the corresponding row of memory 48. Each row of memory 48 also holds (in columns 0 through 7) eight samples of color burst information related to the data points stored in that row.

Although memory 48 is shown as holding only one frame, multiple frames can be held in storage 18 (FIG. 1) by merely repeating the scheme of memory 48.

In accordance with the NTSC video format, frame 40 is represented by an NTSC signal that comprises the entire sequence of horizontal scan lines 1–525. In the signal, field 44 appears first followed by field 46. Within each field the horizontal scan lines appear in order.

Figure 3:
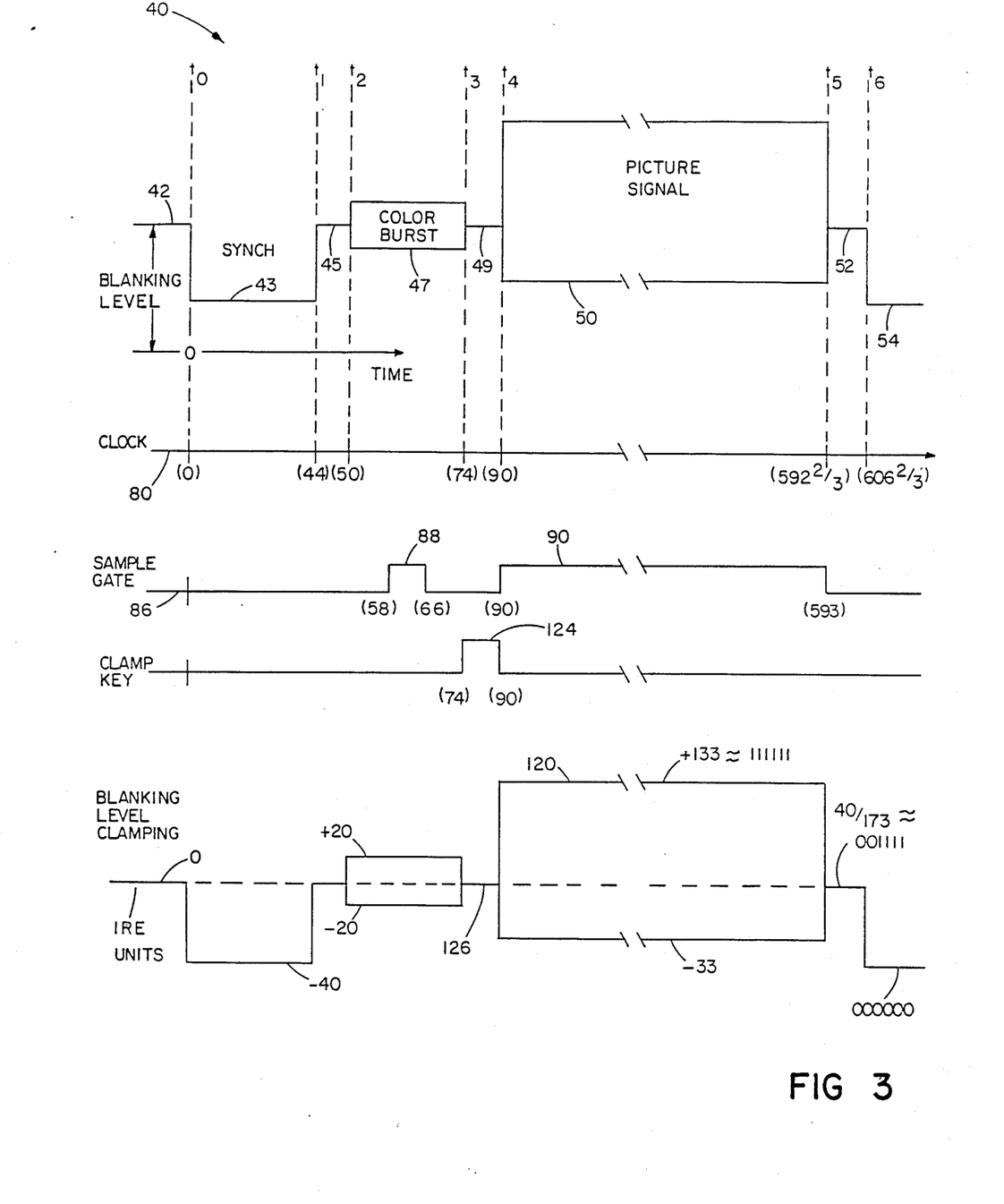
FIG. 3 are timing diagrams for one horizontal scan line of an NTSC video signal.

Referring to FIG. 3, each horizontal scan line 42 begins with a horizontal synch signal 43 (in a time interval between $t_0$ and $t_1$), followed by an interval 45 between $t_1$ and $t_2$ in which a blanking level appears. Next, an interval 47 between $t_2$ and $t_3$ carries a 9-cycle color burst of a 3.579545, i.e. 3.58 megahertz (nominal), subcarrier. Time $t_2$ occurs exactly 19 cycles (of the subcarrier) after time $t_0$. Another blanking level interval 49 occurs between $t_3$ and $t_4$ followed by the picture signal interval 50 between $t_4$ and $t_5$. The picture signal carries in composite form (superimposed on the 3.58 megahertz color subcarrier in a conventional manner) information about the intensities of red, green, blue. (The full bandwidth of the picture signal is approximately 4.2 MHz; hence, the 9.54 MHz sampling rate--discussed below---more than satisfies the Nyquist sampling requirement). The scan line then returns to the blanking level during interval 52 between $t_5$ and $t_6$ (also called the front porch). The horizontal scan line ends at $t_6$. The next horizontal scan line begins immediately at $t_6$ with the horizontal synch signal 54. The total time elapsed between $t_0$ and $t_6$ is 63.56 microseconds. The horizontal scan lines appear at the nominal rate of $$f_H = \frac{3.58 \text{ (nominal)} \times 10^6 \times 2}{455}$$

Figure 4:
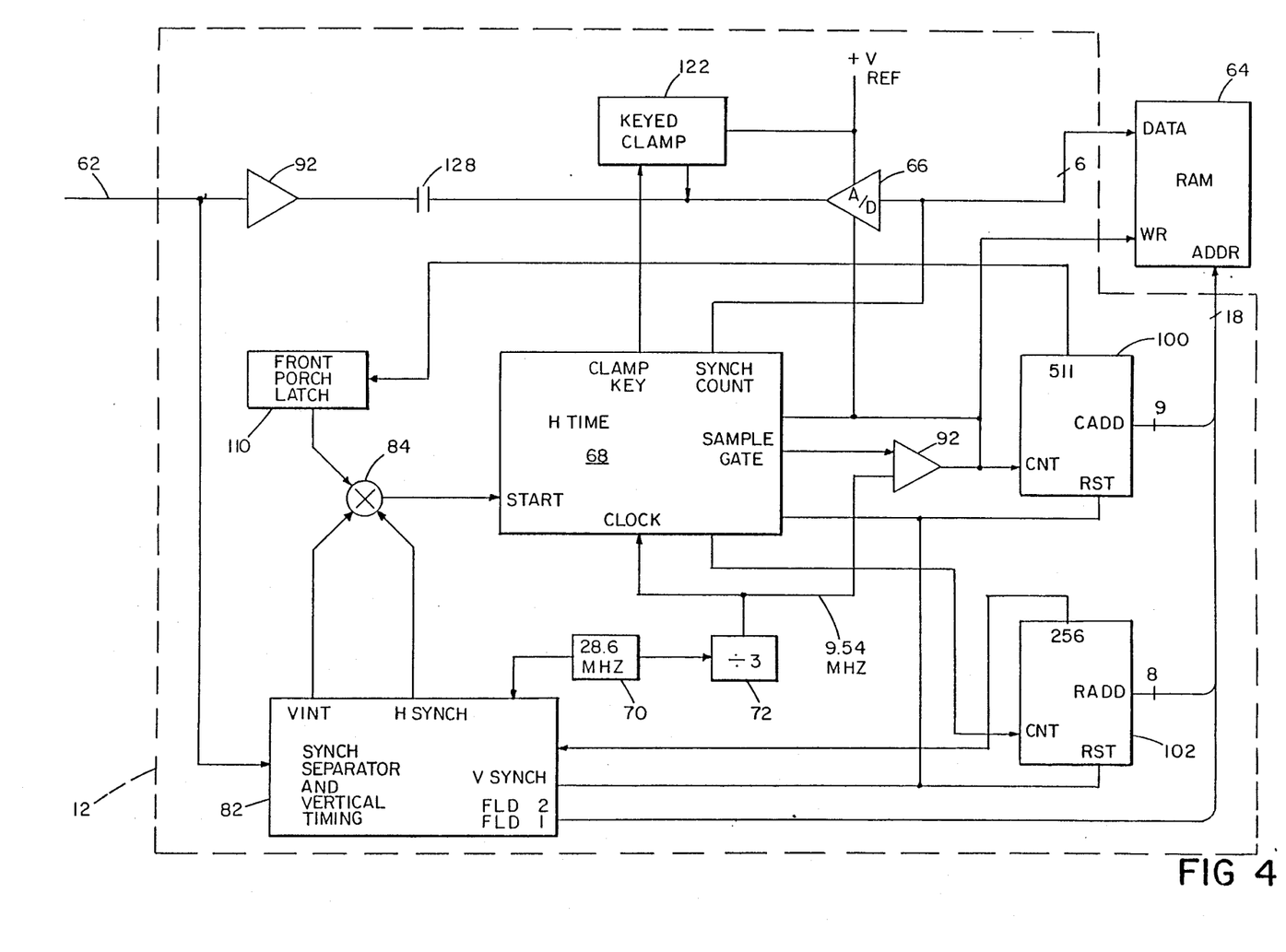
FIG. 4 is a block diagram of a digital encoder and associated memory.

Referring to FIG. 4, digital encoder 12 receives each successive horizontal scan line of frame 40 on line 62, and after processing it (in a manner described below) stores corresponding color burst samples and picture signal samples in digital form in a dynamic RAM 64 (which corresponds to memory 48, FIG. 2). The digital samples to be stored are generated by an analog-to-digital converter 66. The color burst samples are taken during a carefully selected portion of the color burst interval 47 (FIG. 3), and the picture signal samples are taken during picture signal interval 50 (FIG. 3). The timing of the sampling is governed by a controller (HTIME) 68. Controller 68 is cadenced (via its CLOCK input) by 9.54 MHz clock pulses that are generated by dividing down a 28.6 MHz clock 70 in a divide-by-three element 72.

Referring again to FIG. 3, time line 80 illustrates that there are 606⅔ of the 9.54 MHz clock intervals within the time period (between $t_0$ and $t_6$) spanned by a complete horizontal scan line, and also shows (in parentheses) the indexes of the clock intervals that occur at times $t_0$ through $t_6$, respectively.

Referring again to FIG. 4, in order to restart controller 68 at clock interval zero at time $t_0$ for each succeeding horizontal scan line, encoder 12 includes a synch separator and vertical timing circuit 82 that detects (in a conventional manner) the horizontal synch signals 43 and the vertical synch information contained in the horizontal scan lines.

Each time a horizontal synch signal is detected (indicating the start of a new horizontal scan line) circuit 82 sends a signal from its HSYNCH output to a logic element 84. Assuming other conditions (described below) are satisfied, element 84 then sends a signal to the START input of controller 68 which resets a clock pulse counter located in controller 68 to zero. Controller 68 then counts pulses appearing at its CLOCK input. Controller 68 turns on its SAMPLE GATE output during two specific clocked intervals for each horizontal scan line.

Referring again to FIG. 3, the SAMPLE GATE output 86 is turned on in one interval 88 between clock pulses 58 and 66 (to sample the color burst 45), and during a second interval 90 between clock pulses 90 and 594 (to sample the picture signal 50).

Referring again to FIG. 4, the SAMPLE GATE output and the 9.54 MHz clock are both inputs to an AND gate 92 whose output therefore comprises streams of clock pulses (at 9.54 MHz) that appear only during the two specified sampling intervals. Each output pulse of gate 92 triggers A-to-D 66 to generate a 6-bit sample of the horizontal scan line which is then stored in RAM 64. RAM 64 comprises six readily available 256 K RAMS, e.g., Fujitsu MB81256-10 NMOS Dynamic RAM, each having a 512 row×512 column configuration, and each connected to receive on its DATA input one of the six bits from A-to-D 66. The output of gate 92 is also connected to the WRITE input of RAM 64 to coordinate the write enabling of RAM 64 with the delivery of samples from A-to-D 66. The address in RAM 64 where each sample is to be written is governed by an 18-bit address comprising 9 column address bits (generated at the CADD output of a column address counter 100), 8 row address bits (generated at the RADD output of a row address counter 102) and one field address bit (generated at the FLD2/FLD1 output of circuit 82).

In order to fill up the rows and columns of RAM 64 with the proper samples in accordance with the organization shown in memory 48 (FIG. 2), counters 100 and 102 are reset to zero by signals sent from the VSYNCH output of circuit 82 to the RESET inputs of counters 100, 102, each time a conventional vertical synch signal is detected in the NTSC signal. At the beginning of a frame, the FLD2/FLD1 output of circuit 82 is set to FLD 1, so that the first sample from the color burst interval of the first horizontal scan line of the frame is stored in row 0, column 0 of RAM 64. The CNT input of counter 100 is connected to the output of gate 92 so that, with each successive sample, the column address is incremented by one. Each time the column counter 100 reaches 512 (i.e. at the end of the scan line), its 512 output triggers the CNT input of row counter 102, causing the count output to increment by one (thus pointing to the next row in RAM). When RADD reaches 256, it signals the vertical timing generator 82 to set the VINT wait state latch. Depending upon the length of the wait for a new vertical synch contained in the input signal (nominally one-half of a scan line or a full scan line), the FLD2/FLD1 latch is set. The output of this latch is used as the ninth bit of address, in combination with RADD, to properly locate the two fields of a frame in RAM. Thus, once the first field has been stored, the FLD1/FLD2 output of circuit 82 is set to FLD 2 and the second field is stored beginning at row 256 of RAM 64.

The 512 output of counter 100 is also connected to the input of a front porch latch 110 whose output is thus enabled beginning at the 594th clock pulse (see FIG. 3). The output of latch 110 is provided to logic element 84, which delivers a pulse to restart controller 68 to begin timing the sampling of the new horizontal scan line.

Figure 5:
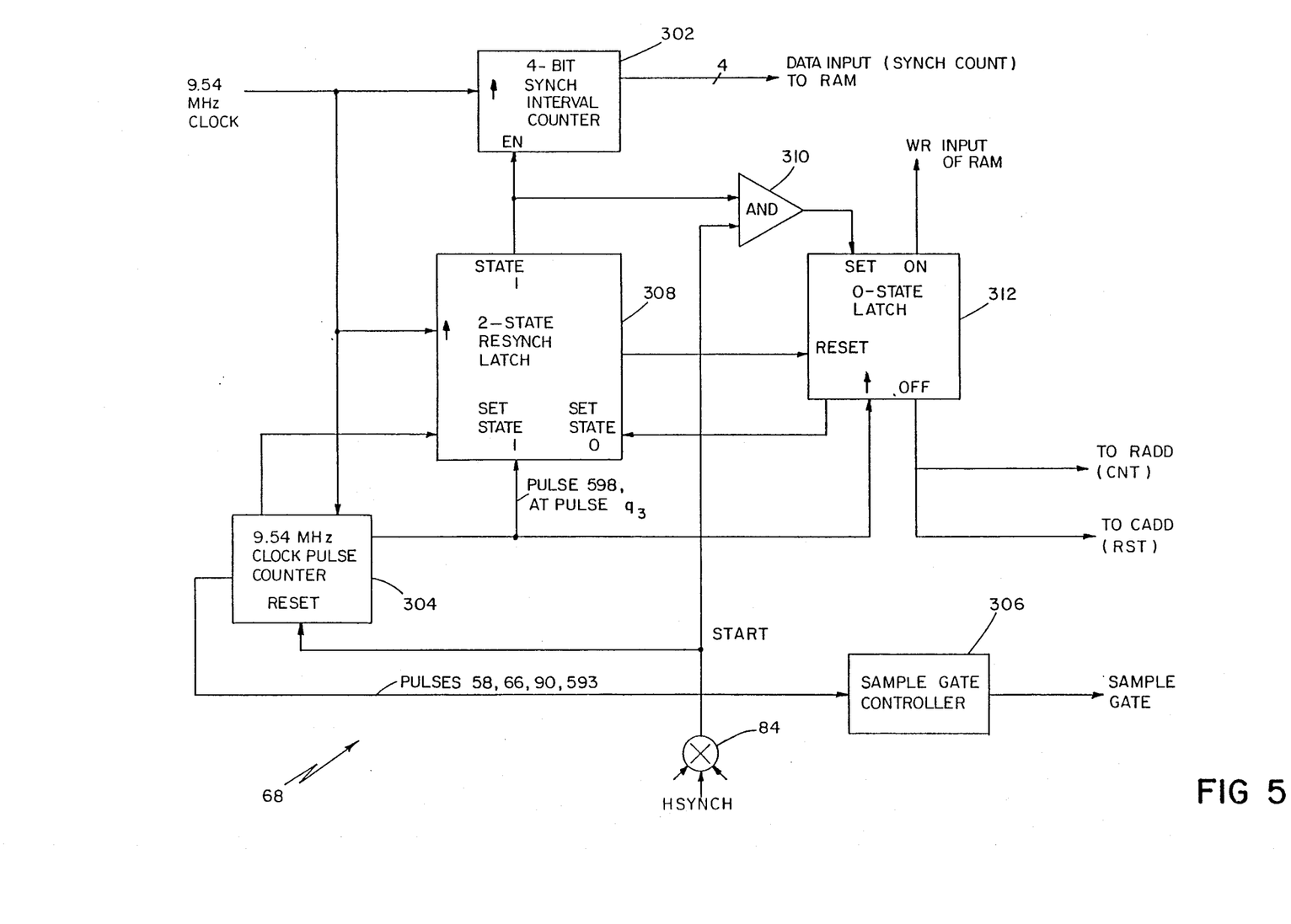
FIG. 5 is a graph of a color burst.

Referring to FIG. 5, the sampling frequency of encoder 12 (9.54 MHz) and the timing of the interval (clock cycles 58 through 66) during which the color burst 26 is sampled results in eight samples $S_0$-$S_7$ of the subcarrier sine wave which are spaced at 135° intervals and thus fit exactly within three cycles of the subcarrier 110. Thus by duplicating the eight samples during three successive three-cycle intervals (a total of nine cycles) the entire color burst interval is easily reconstructed, as described below. Also, because there are exactly 16 pulses of the 9.54 MHz clock between the end of the color burst and the beginning of the color picture, the reconstructed color burst interval will automatically be exactly in phase with the color picture. Furthermore, the average value of the eight samples of the color burst is exactly equal to the blanking level, a feature that is taken advantage of in a manner to be explained.

Referring again to FIG. 4, encoder 12 includes circuitry for capturing the standard NTSC blanking level contained in the horizontal scan lines. The voltage gain of input amplifier 92 is set to a level that causes the input signal to ADC 66 to match the reference voltage $+V_{REF}$ selected for the ADC. That reference voltage is $+133$ IRE units (as shown on line 120 of FIG. 3).

During the period between clocks 74 and 90 (i.e., the interval $t_3$-$t_4$ in FIG. 3), the CLAMP KEY output of HTIME triggers a conventional keyed clamp circuit 122 (see line 124 of FIG. 3). The keyed clamp circuit sets the DC voltage at the input to ADC 66 to a value equal to zero on the IRE scale as depicted at line 126 on FIG. 3, namely to a value that is 40/173 times the value of $V_{REF}$. As a result, ADC 66 will output binary 111111 (equivalent to IRE+133) at the positive peak excursion of the picture signal, and will output binary 000000 at the negative valley (equivalent to IRE−40) of the horizontal synch 43, were it enabled.

During the interval when it is enabled, clamp circuit 122 causes a capacitor 128 to charge such that the DC level of the ADC input is fixed at a value that will produce binary 001111 (the blanking level) at the output of ADC 66. Note that the capacitor 128 discharges only a negligible amount between successive scan lines.

As a result, the DC level of the stored digital samples of the color burst is automatically set to a level equivalent to binary 001111 (recall that the average value of the 8 color burst samples is the blanking level). The relative DC levels of the digital color burst samples and the digital picture signal samples are thus maintained automatically without requiring additional storage of blanking level data, thus automatically and digitally providing the blanking level function otherwise performed by conventional sandcastle circuitry.

We turn now to a description of a decoder for deriving an analog reproduction of the original NTSC signal from the digital samples stored in RAM 64.

Figure 6:
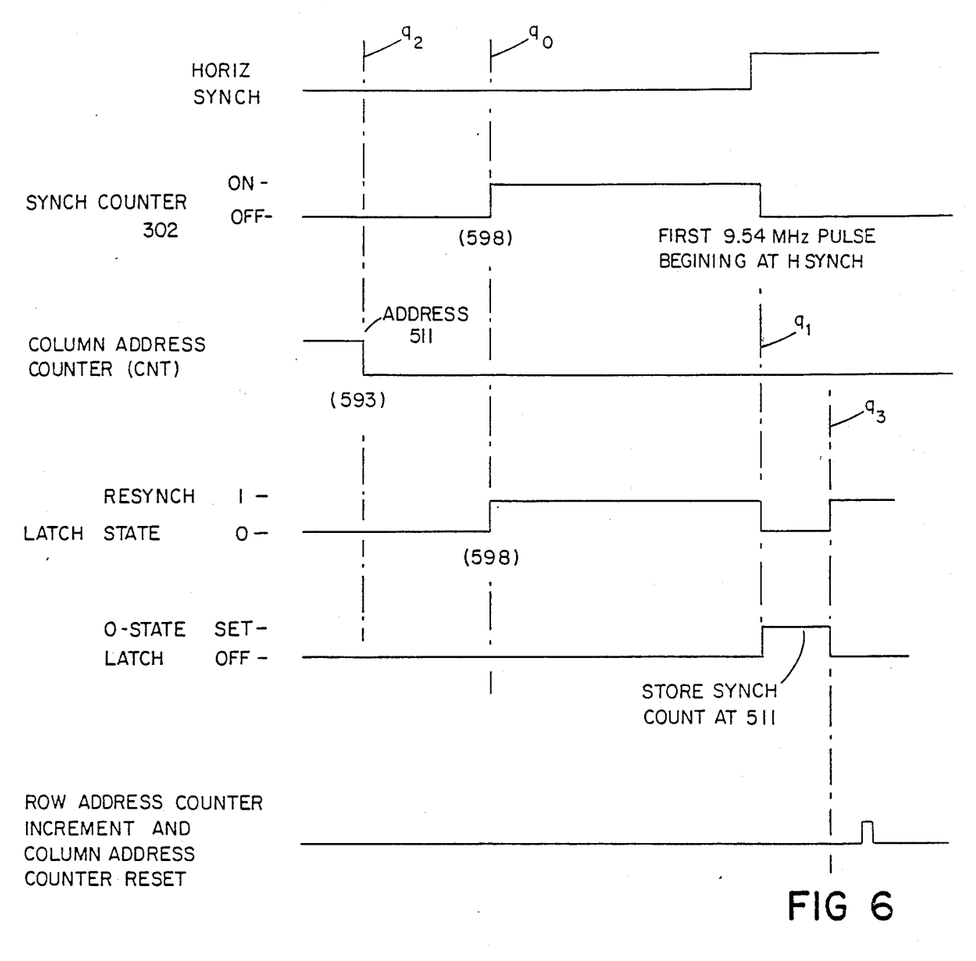
FIG. 6 is a block diagram of a decoder for reconstituting an NTSC signal from a digitally stored video frame.
Figure 7:
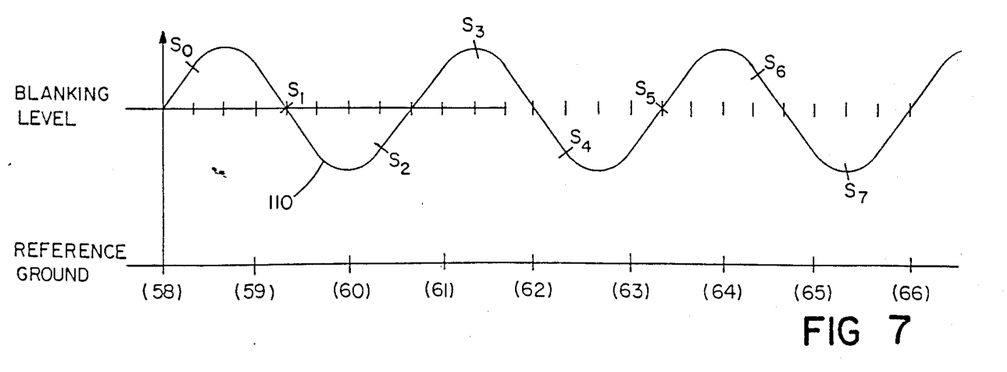
FIG. 7 is a timing diagram for FIG. 6.

Referring to FIGS. 6, 7, in decoder 20 a 28.6 MHz clock 130 drives a conventional camera synch integrated circuit 132 and, via divide-by-3 element 134, provides a 9.54 MHz clock. Synch circuit 132 has a horizontal output connected to a CNT input of a 9-bit row address counter which, when enabled, causes the row address (RADD) output of counter 136 to increment each time a new horizontal scan line is to be reconstructed. The RADD output is connected to provide 9-bit row addresses to RAM 64. The 9-bit column addresses are provided from the CADD output of a 9-bit column address counter 138, whose CNT input is driven by pulses from the READ ADDRESS CONTROL output of a timing generator 140.

Timing generator 140 is clocked at its CLOCK input by 9.54 MHz pulses and delivers 512 pulses at that rate to the CNT input of counter 138 to access the 512 successive samples corresponding to each horizontal scan line. The address generation is coordinated with the actual reading of RAM 64 by signals fed from the READ RAM output of timing generator 140 to the RD input of RAM 64.

The six-bit output of RAM 64 is fed to a tri-state buffer (MEM) 142. MEM 142 passes the digital samples from RAM 64 to a digital-to-analog converter 144 whenever its EN input is enabled. The input of DAC 144 has a parallel connection to a second tri-state buffer (PLUG) 146 which has a similar EN input. The DAC SOURCE SELECT output of generator 140 enables PLUG 146 directly and enables MEM 142 indirectly (via inverter 147) such that MEM 142 is enabled during clock intervals 50–74 and 90–594, as shown on line 161, FIG. 7, while PLUG is enabled at all other times.

A composite synch signal 160, FIG. 7 (from the COMP SYNCH output of SYNCH 132) is connected to the four least significant input bit positions (0,1,2,3) of PLUG 146 and causes the output of PLUG 146 to be 000000 (between $t_0$ and $t_1$) in order to generate the necessary synch signal for each horizontal scan line.

The READ RAM SIGNAL 162, FIG. 7, and READ ADDRESS CONTROL signal (as suggested schematically at 163, FIG. 7) work in concert to cause three successive readouts of the first eight locations of a given row in RAM (beginning with clock pulse 50) in order to produce the full 9-cycle color burst 165, FIG. 7, of the 3.58 MHz subcarrier at the output of DAC 144. The remaining 504 samples in a row of RAM 64 are read from the RAM at the proper time (beginning with clock pulse 90) to provide the picture signal 167, FIG. 7, of the scan line.

The color burst and the picture signal have the proper phase relationship because the 16-count delay in DAC SOURCE SELECT (74–90) represents exactly 6 cycles of 3.58 MHz. PLUG 146 provides the proper blanking level binary values to fill the remaining time intervals 169, FIG. 7. DC component irregularities in the output of DAC 144 because of the blanking level clamping arrangement previously described.

The reconstructed NTSC signal 180 (FIG. 7) is delivered via a low pass filter 182 to an output line 184.

Figure 8:
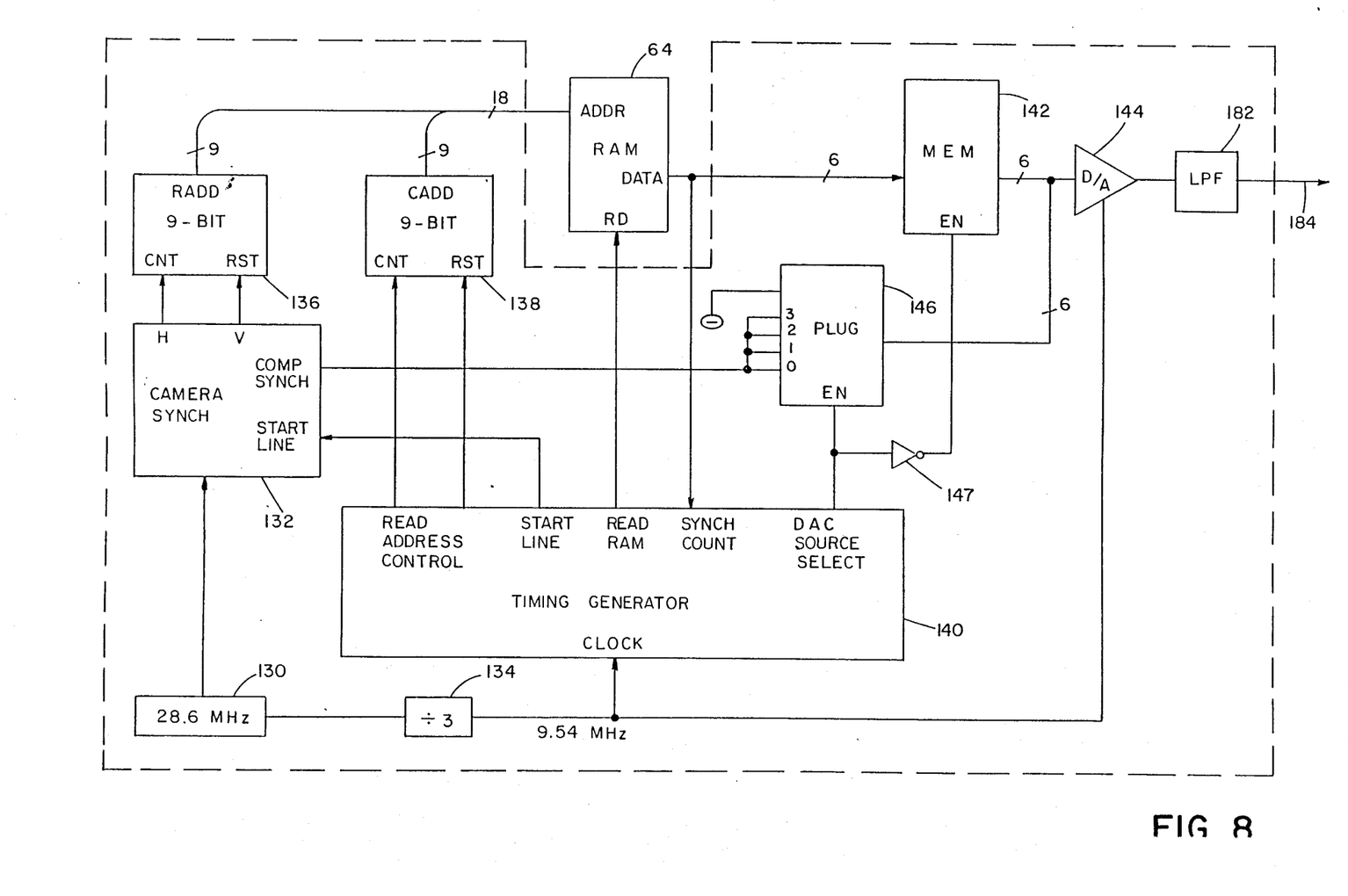
FIG. 8 is a block diagram of a demodulator front-end for reconstituting from a digitally stored video frame, signals for use by an NTSC demodulator.
Figure 9:
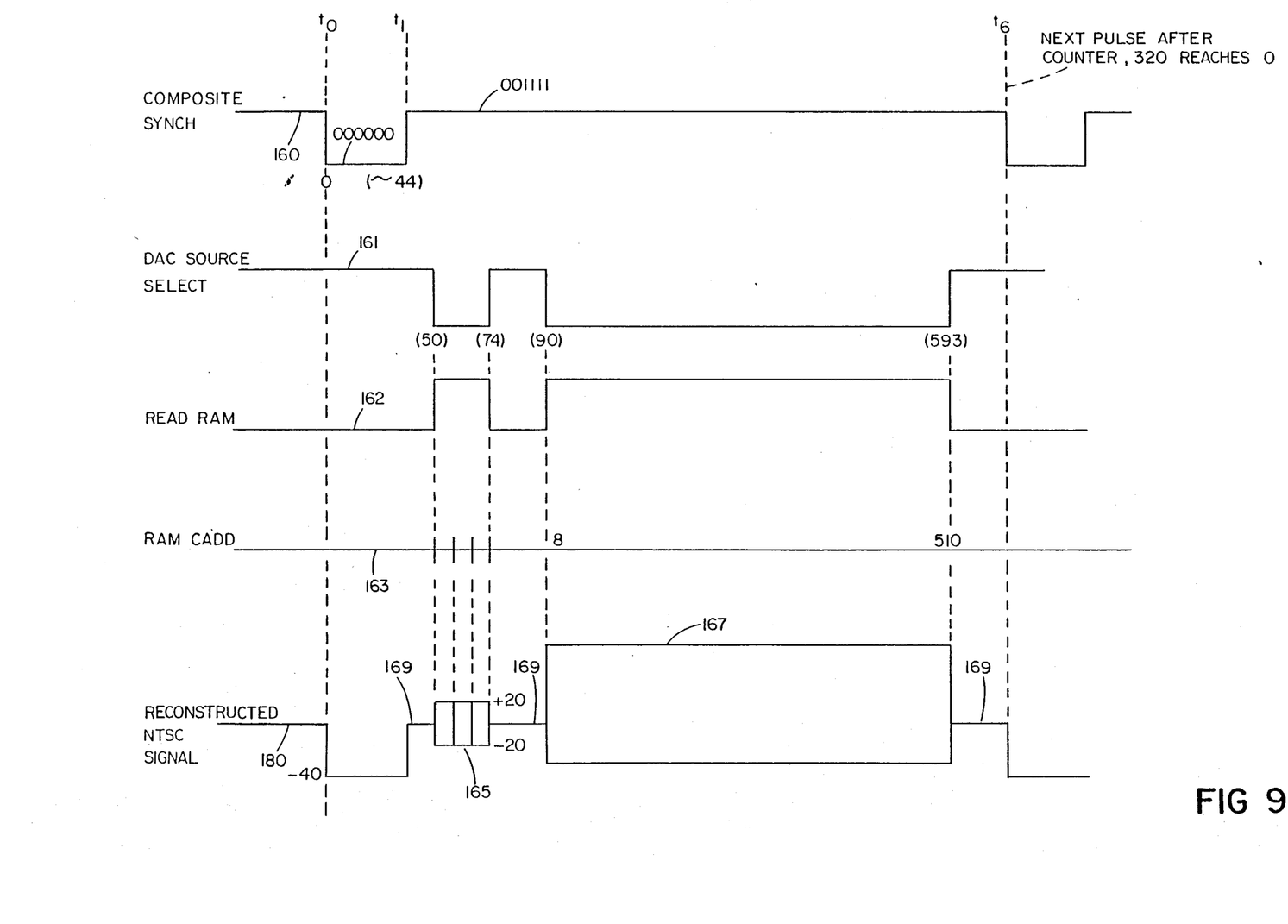
FIG. 9 are timing diagrams for FIG. 8.

Referring to FIGS. 8, 9, in other applications, to use the stored digital frame samples to produce RGB signals for a display device, the decoder of FIG. 6 is augmented to form a demodulator front-end 22 as follows.

The READ CONTROL signals from generator 140 are simplified because, for a given row, only simple readout need occur from the 8-sample color burst 200 and the 504-sample picture signal 202.

There are two D/A converters 204, 206, one for the picture signal (chroma, luma), the other for the color burst 0° reference signal. Both D/A converters are clocked from the 9.54 MHz clock, but the clock pulses reach D/A 204 only when AND gate 208 is enabled by the DESTINATION SELECT output (210, FIG. 9) of generator 140, i.e. between clock pulse 90 and clock pulse 504.

The eight color burst samples can be loaded into an 8 ×6 shift register 210 at any time prior to the 90th clock pulse, provided that the pause before the (90) pulse is at least 8N (where N is an integer). The loading is done via logic 212 which in turn is enabled by the DESTINATION SELECT output of generator 140. Once loaded, register 210 enters a recirculating mode during which the eight samples are delivered repeatedly in cycles to D/A 206 to generate an in-phase subcarrier reference signal 220, that has a 0° phase relationship to the CHROMA/LUMA output 213 of DAC 204.

A delay unit 222 may also be used to provide a clock 224 that also has a frequency of 9.54 MHz but 90° out of phase with the clock output of divide-by-three 134. This is done by delaying the original 9.54 MHz clock by 2 cycles of the 28.6 MHz clock. Clock 224 may be used to gate the outputs of register 210 outputs which are the inputs to another D/A converter 230. As a result, the output of D/A 230 is a quadrature reference signal 240 exactly 90° out of phase with signal 220. By proper selection of delays any relative phase relationship can be obtained in increments of $22\frac{1}{2}$ degrees.

If the D/As 204, 206, 230, are replaced by simple digital interfaces at points x, y, and z, direct connection to a digital demodulator is possible. In either case, the invention obviates the need for the phase locking, blanking, level clamping, and tint circuitry normally associated with the sandcastle period in analog color television demodulation.

Other embodiments are within the following claims.

I claim:

1. Apparatus for digitally encoding an analog composite color NTSC video signal, and for subsequently displaying the color picture signal appearing in each horizontal scan line of the resulting encoded signal, comprising
    an analog-to-digital converter for generating digital samples of the color burst signal appearing in each said horizontal scan line, and
    means for providing a reproduction of said color burst signal generated directly from and based solely on said digital samples of said color burst signal, said means for providing including means for storing a sequence of said samples, and means for repeatedly withdrawing said samples from said storing means for delivery at a rate and in an order such that said withdrawn samples represent a reproduction of said color burst signal having a predetermined phase relationship to said subsequently displayed color picture signal.

2. The apparatus of claim 1 wherein an integral number of said digital samples exactly span an integral number of cycles of the subcarrier of said NTSC signal.

3. The apparatus of claim 1 wherein said digital samples are generated at the rate of 8/3 times the subcarrier frequency of the NTSC signal.

4. The apparatus of claim 1 wherein said digital samples of said color burst signal have an average level equal to a blanking level of said NTSC signal.

5. The apparatus of claim 1 wherein said phase relationship is 0°.

6. The apparatus of claim 1 further comprising alternate means for withdrawing said samples from said storing means for delivery at a rate and in an order such that the output of said withdrawn samples represent a second additional reproduction of said color burst signal having a predetermined phase offset from said first color burst signal reproduction.

7. The apparatus of claim 6 wherein said predetermined phase offset is 90°.

8. The apparatus of claim 1 wherein said means for repeatedly withdrawing said samples from said storing means withdraws said samples in cycles to generate a reference wave for use in demodulating said color picture signal.

9. The apparatus of claim 1 further comprising a digital-to-analog converter for converting said color burst reproduction to analog form.

10. Apparatus for digitally encoding an analog composite color NTSC video signal, said apparatus comprising
an input port for receiving said signal,
an analog-to-digital converter for generating digital samples of said signal at a predetermined sampling rate, and
an output for delivering said digital samples at said rate, said delivered digital samples spanning less than all of said color video signal,
said predetermined sampling rate being 8/3 times the subcarrier frequency of the NTSC signal, said samples including samples of some but less than all of the color burst signal.

11. The apparatus of claim 10 wherein said samples are taken only during portions of the color burst signal and during portions of the color picture signal in each horizontal scan line of said NTSC signal.

12. The apparatus of claim 11 further comprising circuitry for reproducing said color picture from said digital samples taken during said color picture signal, and for generating a phase reference signal based on said digital samples taken during said color burst signal.

13. The apparatus of claim 12 wherein said circuitry generates two said phase reference signals, one in-phase and one quadrature.

14. The apparatus of claim 10 wherein said delivered digital samples include exactly three cycles of said color burst signal.

15. The apparatus of claim 10 further comprising
a memory for storing said digital samples, said memory being no larger than 256K samples.

16. The apparatus of claim 10 further comprising
circuitry including a digital-to-analog converter for reproducing said NTSC signal from said delivered samples.

17. Apparatus for digitally encoding an analog composite color NTSC video signal representing a 525-line video frame, each line including a color burst signal portion, said apparatus comprising
an input port for receiving said signal,
an analog-to-digital converter for generating digital samples of selected portions of each said line, and
an output port for delivering said digital samples,
said digital samples spanning less than all of said color video signal and including samples of said color burst signal, to capture an entire said frame in a set of said digital samples numbering no more than 256K samples.

18. The appparatus of claim 17 wherein said digital samples comprise 512 samples for each of 512 horizontal scan lines.

19. The apparatus of claim 17 wherein said samples comprise 512 samples for each horizontal scan line, including eight samples taken from the color burst signal portion of said NTSC signal, and 504 samples covering the picture signal portion of the NTSC signal.

20. Apparatus for digitally encoding and storing the horizontal scan lines of an analog composite color NTSC video signal that includes a color picture signal portion and a burst signal portion, said apparatus comprising
an input port for receiving said composite color NTSC video signal,
an analog-to-digital converter for generating digital samples of said video signal,
a memory for storing said digital samples including samples of some but less than all of said color burst signal portion, said memory having a row address input for receiving a row address specifying a row in said memory, and a column address input for receiving a column address specifying a column in said memory,
a row counter for delivering row addresses to said row address input,
a horizontal synch detector for detecting the horizontal synch signal in each said horizontal scan line and for providing an increment signal in response to said horizontal synch signal to cause said row counter to increment by one for each succeeding said horizontal scan line in said NTSC video signal,
a column counter for delivering column addresses to said column address input, said column counter being incremented by one for each successive digital sample generated from a given said scan line,
the number of said samples generated for each said horizontal scan line being equal to the number of columns in said memory.

21. The apparatus of claim 20 wherein said memory comprises 512 rows and 512 columns of locations for receiving samples.

22. A method for digitally encoding an analog composite color NTSC video signal and for subsequently demodulating the color picture signal appearing in each horizontal scan line of the resulting encoded signal, said method comprising the steps of:
generating by analog-to-digital conversion digital samples of the color burst signal appearing in each horizontal sacn line,
storing a sequence of said samples, and
providing by digital-to-analog conversion an analog reproduction of said color burst signal based only on said digital samples of said color burst signal, by repeatedly withdrawing said stored samples for delivery at a rate and in an order such that said withdrawn samples represent a reproduction of said color burst signal having a predetermined phase relationship to said reproduction of said color picture signal.

23. A method for digitally encoding an analog composite color NTSC video signal for a 525-line video frame, each line including a color burst signal portion, said method comprising the step of generating, by analog-to-digital conversion, digital samples spanning less than all of the color video signal and including samples of said color burst signal, to capture an entire said frame, said generated samples numbering no more than 256K samples.

24. A method for digitally encoding and storing the horizontal scan lines of an analog composite color NTSC video signal that includes a color picture signal portion and another signal portion, said method comprising the steps of generating digital samples of said video signal, storing said samples including samples of some but less than all of said other signal portion in a memory having row and column address inputs, detecting the horizontal synch signal in each said horizontal scan line, incrementing the row address once for each succeeding horizontal scan line, and incrementing the column address once for each successive digital sample from a given scan line, the number of samples generated for each horizontal scan line being equal to the number of columns in the memory.

25. Apparatus for digitally encoding an analog composite color NTSC video signal, and for subsequently displaying the color picture signal appearing in each horizontal scan line of the resulting encoded signal, comprising an analog-to-digital converter for generating digital samples of the color burst signal appearing in each said horizontal scan line, said digital samples spanning some but less than all of said color burst signal, and means for providing a reproduction of said color burst signal generated directly from and based solely on said digital samples of said color burst signal, said means for providing including means for storing a sequence of said samples, and means for withdrawing said samples from said storing means for delivery at a rate and in an order such that said withdrawn samples represent a reproduction of said color burst signal having a predetermined phase relationship to said subsequently displayed color picture signal.

* * * * *

UNITED STATES PATENT AND TRADEMARK OFFICE
CERTIFICATE OF CORRECTION

PATENT NO. : 4,857,990

DATED : August 15, 1989

INVENTOR(S) : Thomas B. Horgan

It is certified that error appears in the above-identified patent and that said Letters Patent is hereby corrected as shown below:

The title should read --Digital Storage of Composite Color NTSC Video Signals--;

Col. 1, Title, please amend the title as above;
Col. 6, line 43, insert a space between "+$V_{REF}$" and "selected".

Signed and Sealed this

Eighteenth Day of June, 1991

*Attest:*

HARRY F. MANBECK, JR.

*Attesting Officer*      *Commissioner of Patents and Trademarks*